United States Patent [19]

Squicciarini

[11] Patent Number: 4,735,566
[45] Date of Patent: Apr. 5, 1988

[54] FLUID JET CUTTING MEANS OF EXTRUDED DOUGH

[75] Inventor: Alex J. Squicciarini, Fair Lawn, N.J.

[73] Assignee: Nabisco Brands, Inc., Parsippany, N.J.

[21] Appl. No.: 901,636

[22] Filed: Aug. 29, 1986

Related U.S. Application Data

[62] Division of Ser. No. 785,386, Oct. 8, 1985.

[51] Int. Cl.⁴ ............................................. A21C 11/10
[52] U.S. Cl. ..................................... 425/312; 83/177; 264/148; 426/503; 426/518
[58] Field of Search ............ 425/103, 106, 312, 133.1; 426/518, 503; 99/536, 516; 83/53, 177, 884; 264/148

[56] References Cited

U.S. PATENT DOCUMENTS

| | | | |
|---|---|---|---|
| 2,985,050 | 5/1961 | Schwacha | 83/177 |
| 3,351,113 | 11/1967 | Suzuki et al. | 146/230 |
| 3,468,998 | 9/1969 | Lingl | 264/148 |
| 3,524,367 | 8/1970 | Franz | 83/53 |
| 3,526,162 | 9/1970 | Willcox | 83/177 |
| 3,543,822 | 12/1970 | Morikawa | 146/3 |
| 3,646,894 | 3/1972 | Hasten et al. | 99/86 |
| 4,152,958 | 5/1979 | Bogert | 82/47 |
| 4,246,838 | 1/1981 | Pulver et al. | 83/884 |
| 4,266,920 | 5/1981 | Hayashi et al. | 425/133.1 |
| 4,275,647 | 6/1981 | Chambers et al. | 426/94 |
| 4,356,197 | 10/1982 | Devitt et al. | 426/89 |
| 4,469,475 | 9/1984 | Krysiak | 425/133.1 |
| 4,488,464 | 12/1984 | Rooke et al. | 83/99 |
| 4,620,466 | 11/1986 | Jumel et al. | 83/177 |

FOREIGN PATENT DOCUMENTS

| | | | |
|---|---|---|---|
| 1529165 | 10/1978 | United Kingdom | 83/53 |
| 2042398 | 9/1980 | United Kingdom | 83/177 |

OTHER PUBLICATIONS

"McCartney Fluid Jet Cutting System", McCartney Mfg. Co., Inc. (Ingersoll-Rand), (1979).
"Water 'Laser' Cuts Food Products Without Dust, Noise or Maintenance", Food Engineering, (Jul. 1982), p. 99.
"Polymer Mixer Nozzle"/ Fluid Jet Intensifier Module, McCartney Mfg. Co., (Ingersoll-Rand), (1979).
U.S. Trademark Reg. No. 712,744 for "Floodjet".

Primary Examiner—Jay H. Woo
Assistant Examiner—C. S. Bushey
Attorney, Agent, or Firm—Richard Kornutik

[57] ABSTRACT

Apparatus for preparing extruded dough pieces. A dough is extruded to form a ribbon of extruded dough. The ribbon of extruded dough is cut into the extruded dough pieces by means of a high velocity liquid jet. The high velocity liquid jet is comprised of (i) water or (ii) water and an edible, long-chain polymer or (iii) an edible, long-chain polymer and an edible oil.

18 Claims, 2 Drawing Sheets

FLUID JET CUTTING MEANS OF EXTRUDED DOUGH

This is a division of application Ser. No. 785,386, filed on Oct. 8, 1985.

BACKGROUND OF THE INVENTION

1. Field Of The Invention

The invention relates to a process of cutting elongated dough masses, such as the extruded dough and apparatus for such process.

2. Prior Art

Fluid jet cutting has been used commercially, for example, to cut paper and to make cardboard puzzles. Fluid jet cutting has also been used to cut plastics in the food industry.

U.S. Pat. No. 4,246,838 teaches the slitting of the upper surfaces of parallel rows of proofed dough pieces by a plurality of fluid jet spray nozzles. On its face, the patent teaches that quite irregular faces are provided when slitting proofed dough using fluid jet sprays. Exposed surfaces 128 of slit 127 shown in FIG. 4 are quite irregular and are not what could be termed clean or smooth. The patent list buns, breads and coffee cakes as examples of the types of proofed dough it uses. A fluid pressure of about 20 to 40 p.s.i. is used. The patent specifically teaches using water, oil, butter or margarine as the fluid jets, but does not teach the use of a mixture of a polymer and an edible oil as the fluid (liquid) for the cutting jets.

U.S. Pat. No. 3,351,113 directs a jet of water against peeled citrus fruits positioned under water to separate fruit segments.

U.S. Pat. No. 3,543,822 separates or forces apart the segments of rotating peeled citrus fruits using a jet of water.

U.S. Pat. No. 3,524,367 teaches the cutting of hardwood by means of a high velocity liquid jet, which is enhanced by dissolving a long chain polymer (for example, gelatine, polyacrylamide and polyethylene oxide) in the liquid. The jet liquid pressure used is between 10,000 and 100,000 p.s.i. Sufficient long chain polymer is used to raise the viscosity of the liquid at low shear rates, but the viscosity significantly drops at the high shear encountered when the liquid exits from the nozzle. The liquid is usually water, but the liquid can be various low-viscosity non-chlorinated oils, alcohols and glycerine. The result is that the jet liquid used in the patent can be a mixture of a long chain polymer and a low viscosity non-chlorinated oil. Methyl cellulose can be used as the long chain polymer and the patent notes that it is non-toxic.

U.S. Pat. No. 4,356,197 teaches coating compositions for foodstuffs, such as chocolate and dried fruit, composed of jojoba oil which is hydrogenated either substantially completely and used in solution in a volatile solvent such as acetone, or partially to a liquid which remains clear for at least 24 hours at 25° C. or less. The coating provides improved stability to the coated foodstuff as compared with the unhydrogenated oil. The partially hydrogenated oil is preferably of low transcontent and may have an Iodine Value as little as 2 units below that of the original oil.

The brochure "McCartney Fluid Jet Cutting System", McCartney Manufacturing Company, Inc., (Ingersoll-Rand), (1979), teaches the use of a fluid jet for the production cutting of foam products, filter paper, gypsum board, granite, fiber reinforced plastics, bakery products, cakes, etc. The fluid jet system uses pressurized water/polymer or water. The fluid jet has velocity of about twice the speed of sound.

The article "Water 'Laser' Cuts Food Products Without Dust, Noise Or Maintenance", Food Engineering, (July 1982), page 99, discloses the use of fluid jet cutting to cut angel food cakes, apple pie wedges, cheese cakes, date nut cakes and fig cookies. The applications include cakes, cookies, candy bars and bakery products. The product can be fresh or frozen, and can be packaged. The fluid used for the fluid jet cutting is water. The water pressure used is between 20,000 and 45,000 p.s.i. The water is ejected through a very small orifice (i.e., about 0.1 to about 0.005 inch) at a velocity of about twice the speed of sound. No water is absorbed by the cut product. The use of up to eight nozzles is taught.

Fig newtons or fig bars are made from a long dough tube forming a dough jacket containing a fig jam. The filled dough tube is baked and then cut into pieces. Fig newtons have bulking material included.

Blueberry newtons like fig newtons are first baked in tube form and then cut into pieces. Blueberry newtons or blueberry bars have an outer dough in a jacket form and an inner blueberry fruit filling. Due to the fruit pieces in the blueberry fillings, there is no bulking agent. The blueberry newtons are first formulated from a long tube-like sheath with the blueberry fruit filling inside. It is this filling dough which is baked and cooked. A rotary cutting blade is used to cut the baked tube filled with blueberry fruit filler into pieces. As a particular portion of the rotary blade rotates out of the cutting area, water is sprayed onto the blade cutting surface in order to wash off a build-up of the baked material which sticks onto the blade due to its viscosity and stickiness. Another method that has been used to try to prevent build-up on the rotary cutter blade is the use of a flame to burn off the sticking material. A disadvantage of this is that often the burnt material falls onto or into the blueberry newtons.

BROAD DESCRIPTION OF THE INVENTION

An object of the invention is to provide a process for cutting an elongated dough mass, particularly extruded dough, ribbons of laminated doughs and ribbons of doughs containing fruit fillers and the like. Another object of the invention is to provide apparatus for achieving the immediately above-mentioned process. A further object of the invention is to provide a process for extruding dough and cutting the extruded dough. A still further object of the invention is to provide apparatus for achieving the immediately above-mentioned process. Other objects and advantages of the invention are set out herein or are obvious herefrom to one ordinarily skilled in the art.

The advantages and objects of the invention are achieved by the processes and apparatus of the invention.

The invention broadly includes a process for preparing dough pieces from a ribbon of dough. The ribbon of dough is cut into dough pieces by means of a high velocity liquid jet. The high velocity liquid jet being comprised of (i) water or (ii) water and an edible, long-chain polymer or (iii) an edible, long-chain polymer and an edible oil, the cut ends of said dough pieces being flat, uniform and very smooth. The ribbon of dough, for example, can be a composite of laminated doughs having similar viscosities; or, separate masses of a fruit filler enrobed within the ribbon of dough, which can be cut so that each dough piece contains one of the enrobed masses of fruit filler or confectionary filler. Also the ribbon of dough can have a continuous passageway therein along the central axis of the ribbon of dough, with continuous passageway filled with fruit filler or confectionary filler. Preferably, the fruit filler is a blueberry filler.

The dough and/or fruit filler should not contain hard particulates, such as, chocolate chips, because they interfer with the clean, efficient cutting of the dough into pieces.

The invention involves a process for preparing extruded dough pieces from a ribbon of extruded dough. The ribbon of extruded dough is cut into the extruded dough pieces by means of a high velocity liquid jet. The high velocity liquid jet is comprised of (i) water or (ii) water and an edible, long-chain polymer or (iii) an edible, long-chain polymer and an edible oil. The cut ends of the extruded dough pieces are flatter, more uniform and smoother than when extruded dough is cut into pieces using conventional cutting methods. There is a very low rate of damaged dough pieces from the invention process, there is no danger of metal fragments in the dough as is the case when metal blades are used to cut dough and the blade chips from fatigue.

When the liquid used for the liquid jet is a combination of water and an edible, long-chain polymer, preferably the edible, long-chain polymer is polyethylene glycol. Also, when the liquid used for the liquid jet is a combination of an edible, long-chain polymer and an edible oil, preferably the edible oil is vegetable oil and the edible, long-chain polymer is polyethylene glycol. In such case, the liquid jet has excellent depth penetration, excellent cohesiveness and lower temperatures. Preferably the high velocity liquid jet is at a pressure between about 20,000 and about 45,000 pounds per square inch, and most preferably about 25,000 pounds per square inch. The velocity of the high velocity fluid jet preferably is between about 500 and about 4,000 feet per second. Preferably the temperature of the high velocity fluid jet is between about 20° and about 40° C.

The smoothest cut is obtained when a combination of an edible long chain polymer and an edible oil is used. A proofed dough will give a much rougher cut than a non-proofed dough. The reason may be that, with a proofed dough, an internal pressure from evolved gases, etc., has built up that in effect pulls apart the dough surface in the region where the jet stream cuts the surface.

The cutting of dough provides different problems from the cutting of baked goods. The properties of doughs are different from those of baked goods. The fact that fluid jets can be used to cut doughs into pieces without encountering major problems is totally unexpected over the prior art.

The process also involves a process for preparing extruded dough pieces. The process includes extruding a dough to form a ribbon of extruded dough. The ribbon of extruded dough is cut into the extruded dough pieces by means of a high velocity liquid jet. The high velocity liquid jet is comprised of (i) water or (ii) water and an edible, long-chain polymer or (iii) an edible, long-chain polymer and an edible oil. The cut ends of the extruded dough pieces are flatter, more uniform and smoother than when extruded dough is cut into pieces using conventional methods.

In a similar manner, the invention includes: (a) forming a ribbon of dough which is a composite of laminated doughs having similar viscosities and cutting the ribbon of laminated dough into pieces by means of a high viscosity liquid jet; (b) forming masses of fruit filler enrobbed within a ribbon of dough and cutting ribbon of dough by means of a high viscosity liquid jet into dough pieces each of which contains at least one of the enrobbed masses of fruit filler or confectionary filler; and (c) forming a ribbon of dough which has a continuous passageway therein along its central axis which is filled with fruit filler or confectionary filler and cutting the ribbon of dough by means of a high viscosity liquid jet into pieces. Preferably the fruit filler is a blueberry filler.

Usually the means for carrying or advancing the ribbon of dough is a conveyor belt. The problem encountered with using a conveyor belt underneath the fluid jet stream is that the fluid jet tends to cut or otherwise damage the conveyor belt. The conveyor belt is made of material such as cloth or flexible rubber or plastics. In view of this, the conveyor belt preferably does not come into contact with the ribbon of dough in the immediate region of the dough ribbon where the liquid jet cuts the ribbon of dough. This arrangement is most preferably carried out by having two conveyor belts which are aligned with the adjacent ends slightly set apart so as to form a slot which matches or correlates with the path followed by the fluid jet cutting stream when the ribbon of dough is being cut.

When the liquid used for the liquid jet is a combination of water and an edible, long-chain polymer, preferably the edible, long-chain polymer is polyethylene glycol. Also, when the liquid used for the liquid jet is a combination of an edible, long-chain polymer and an edible oil, preferably the edible oil is vegetable oil and the edible, long-chain polymer is polyethylene glycol. Preferably the high velocity liquid jet is at a pressure between about 20,000 and about 45,000 pounds per square inch, most preferably about 25,000 pounds per square inch. The velocity of the high velocity fluid jet is between about 500 and about 4,000 feet per second. Preferably the temperature of the high velocity fluid jet is between about 20° and about 40° C.

The invention involves apparatus for preparing dough pieces. The invention apparatus includes means for forming dough into a ribbon of dough, and means for advancing the ribbon of dough. Preferably the two conveyor belt version of the advancing or carrier means is used. There is high velocity liquid jet means adapted to cut the ribbon of extruded dough into pieces by means of the high velocity liquid jet. There is also means for supplying liquid to high velocity liquid jet means.

Advantageously, the liquid for the liquid jet is (i) water, (ii) water and an edible, long-chain polymer or (iii) an edible, long-chain polymer and an edible oil. Preferably the high velocity liquid jet is at a pressure between about 20,000 and about 45,000 pounds per square inch, most preferably about 5,000 pounds per square inch. The velocity of the high velocity fluid jet is between about 500 and about 4,000 feet per second. Also, preferably the temperature of the high velocity fluid jet is between about 20° and about 45° C.

DETAILED DESCRIPTION OF THE INVENTION

As used herein, all percentages, parts, ratios and proportions are on a weight basis unless otherwise stated herein or otherwise obvious herefrom to one ordinarily skilled in the art.

Figure 1:
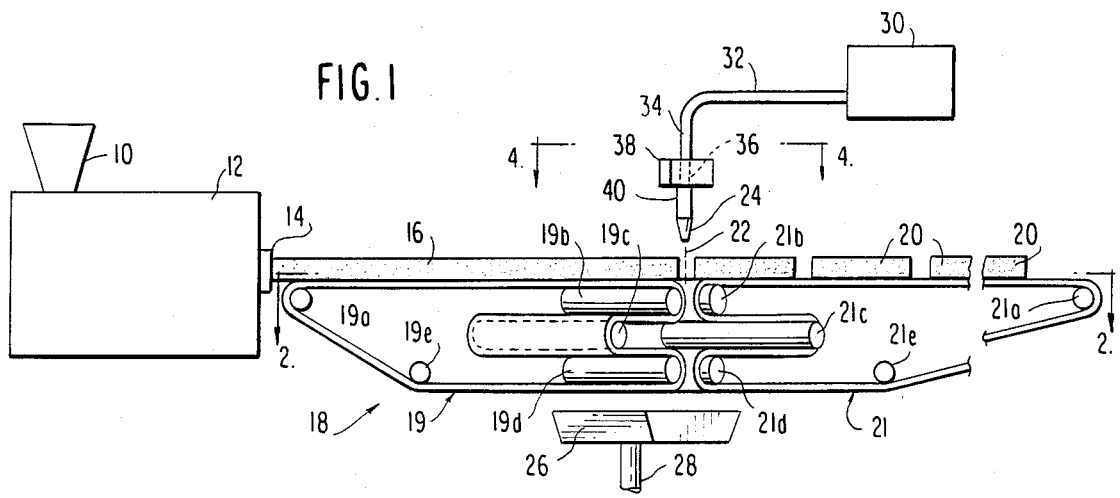
FIG. 1 is a side elevational view of a preferred apparatus for extruding dough and cutting the extruded dough according to the invention.
Figure 2:
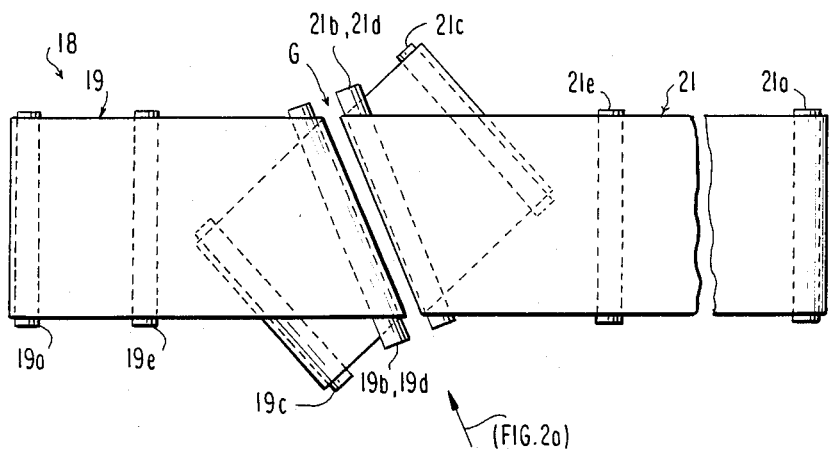
FIG. 2 is a top elevational view of the conveyor system, composed of two separate conveyor belts, for advancing the extruded dough as shown in FIG. 1.

In FIG. 1, the dough ingredients, or premixed dough ingredients, are fed into hopper 10 and then are subjected to normal pressures and temperatures in extruder 12. The dough is extruded out of extruder die 14 to form dough ribbon 16. Belt conveyor 18 advances dough ribbon 16. Belt conveyor 18 is a split conveyor having separate conveyor belt portion 19 and separate conveyor belt portion 21. Gap G is formed by the interface space between conveyor belt portions 19 and 21—see FIG. 2. Gap or slot G is offset at an angle to the direction of advance of belt conveyor 18. Conveyor belt 19 travels around roller 19a and over roller 19b, which is offset at the same angle as gap G so as to help form gap G. In order to take-up the slack in one side of conveyor belt 19 caused by the offset of roller 19b, conveyor belt 19 travels downwards around further offset roller 19c. Then conveyor belt 19 travels over roller 19d, which is offset the same angle as roller 19b is vertically aligned with roller 19b, under roller 19e and back around roller 19a. Conveyor belt 21 travels around roller 21a under roller 21e and around roller 21d. Roller 21d is offset at the same angle as gap G. Then conveyor belt 21 successively travels around roller 21c and roller 21b. Roller 21b is offset at the same angle as gap G so as to help form gap G. Rollers 21b and 21d are vertically aligned with each other. In order to take up the slack in one side of conveyor belt 21 caused by the offset of roller 21b, roller 21c is further offset. Dough ribbon 16 is cut into dough pieces 20 by means of high velocity liquid jet 22 which is produced by jet nozzle 24. Any run off of the liquid from dough pieces 20 and conveyor 18 falls into collection pan 26 and is removed therefrom by drain pipe 28. Liquid is supplied to jet nozzle 24 from pressurized liquid supply tank 30 via line 32, (including flexible line portion 34) vertical tube 36 in motorized casing 38 and nozzle tubing 40.

Figure 4:
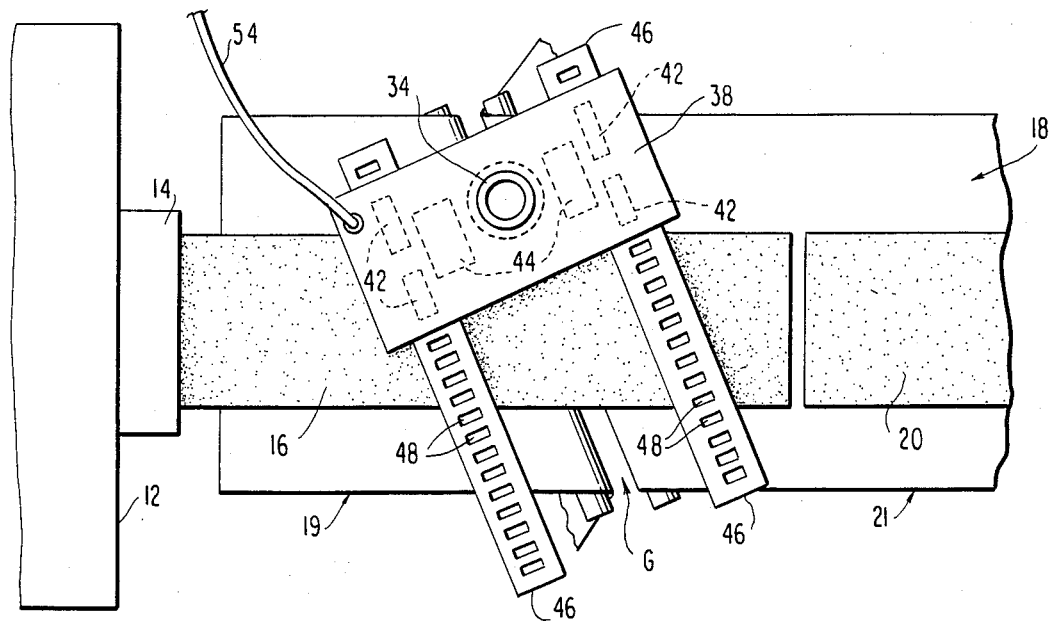
FIG. 4 is a top view of part of the apparatus of FIG. 1 along line 4—4.

In order to obtain a cut across dough ribbon 16 which is perpendicular to the longitudinal axis of dough ribbon 16, jet nozzle 24 must be moved across the breadth of dough ribbon 16 at an angle and speed which compensates for the forward movement of dough ribbon 16. The forward movement is determined by the rate of extrusion of dough ribbon 16—the rate of movement of conveyor 18 is the same as the rate of extrusion. The path of fluid jet 22 corresponds to gap G—see FIGS. 1 and 2. Also gap G is illustrated in FIG. 4. Fluid jet 22 would cut or otherwise damage the belt of conveyor 18 when such belt is cloth, flexible rubber, flexible plastic or the like. Also, without gap G, fluid jet 22 would tend to bounce off of the belt of conveyor 18 and thereby damage and cut the underside of dough ribbon 16 and dough pieces 20 in the cutting region. Also, without gap G the fluid from fluid jet 22 would collect on the belt of conveyor 18 and pieces 20 would become soaked and soggy therefrom.

Figure 2A:
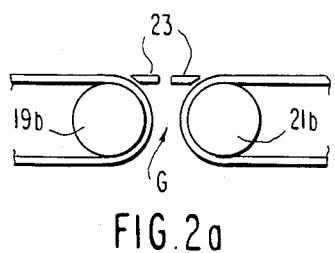
FIG. 2a is a side elevational view of the interface region between the two separate conveyor belts shown in FIG. 2.

Plates 23 shown in FIG. 2a provide support for dough ribbon 16 and dough piece 20 in the area of gap G without interferring with fluid jet 22.

Figure 3:
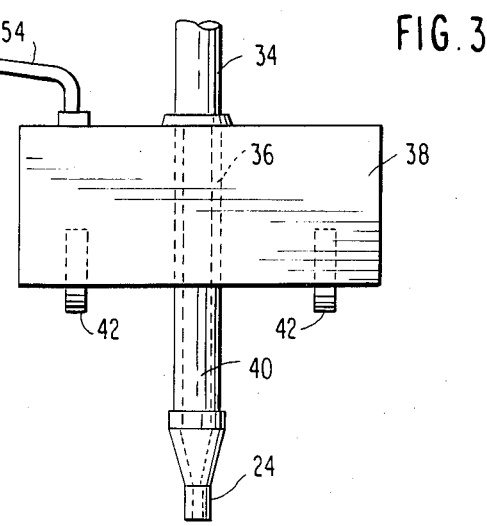
FIG. 3 is a side elevational view of the jet nozzle and carrier casing therefor of the cutting portion of the apparatus of FIG. 1.

Referring to FIG. 4, two pair of small gears 42 are mounted in motorized casing 38. One pair of gears 42 are rotatably mounted tandem on each side of jet nozzle 24 (actually vertical tube 36). The teeth of gears 42 extend below the bottom of motorized casing 38—see FIG. 3. A motor 44 is mounted on each side of vertical tube 36 to drive the corresponding pair of gears 42. (The drive mechanism between motors 44 and gears 38, the mountings of reversible motors 44 and the axle mountings of gears 38 are not shown, but are readily within the skill of those skilled in the art.) Motorized casing 38 is movably mounted on the pair of horizontally-mounted, parallel tracks 46. (The supports for tracks 46 are not shown.) The teeth of gears 42 (see FIG. 3) fit into slots 48 of tracks 46, whereby gears 42 can be used to move motorized casing in either direction on tracks 46. In FIG. 4, tracks 46 are shown at an angle of about 35 degrees to the longitudinal axis of dough ribbon 16. Of course, any other suitable angle can be used. In order to secure a cut across dough ribbon 16 which is perpendicular to the longitudinal axis of dough ribbon 16, for the track angle shown in FIG. 4, motorized casing 38 (hence jet nozzle 24) is moved forward at a speed correlated with the speed with which dough ribbon 16 is moved forward by means of conveyor 16. The track angle and/or dough ribbon 16 speeds require speeds for motorized casing 38 which are readily calculatable by those skilled in the art. It is a simple matter of vector and motion analysis. Controller (computer) 50 is connected to power source (not shown) via electrical lines 52. See FIG. 3. Controller 50 is connected to motors 44 via electrical lines 54 (which are not shown inside of casing 38 or their connections to motors 44, such readily being within the skill of those skilled in the art). Power is also supplied to motors 44 from controller 50 via electrical lines 54. Motors 44 can be dc or ac motors; if dc motors are used, a converter (not shown) will have to be supplied, usually in controller 50, if an ac power source is used.

Once dough 16 is cut, fluid jet 22 is stopped until jet nozzle 24 is moved back to its starting position to start a new cutting cycle.

Figure 5:
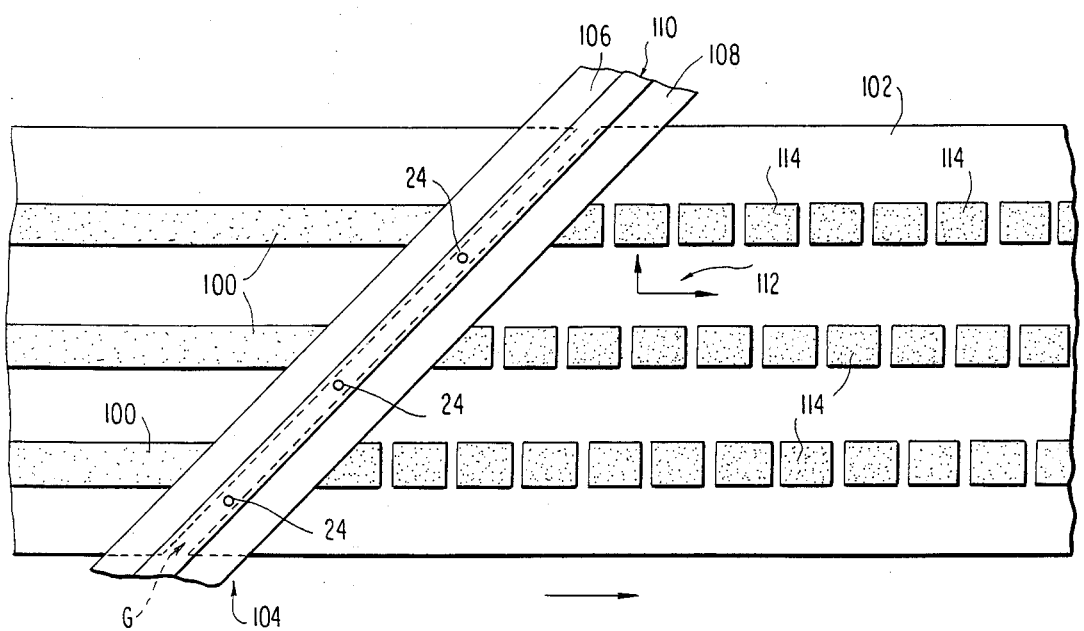
FIG. 5 is a top elevational view of another preferred apparatus for cutting the extruded dough according to the invention.

In FIG. 5, dough strips 100 are conveyed by conveyor belt 102 in the direction indicated by the arrow in the figure. Conveyor belt 102 has, for example, a width of 39 inches. Typically, each of the three dough strips 100 has a width in the range of 1.5 to 1.625 inches. Cross arm 104 is set at an angle across conveyor belt 102 and the three dough strips 100 thereon. Cross arm 104 is composed of arm portions 106 and 108 which have overlapping adjustable portions 110 (which are held in place by screws 112) for adjusting the positions of arm portions 106 and 108 in relation to each other. Three fluid jet nozzles are located on the underside of each of subarms 106 and 108. (The fluid jet cutters are not shown. The embodiment shown in FIG. 5 is similar to the embodiment shown in FIGS. 1 through 4, with most of the apparatus therein being utilized in the embodiment of FIG. 5.) Each fluid jet nozzle is positioned perpendicular to one of the dough strips 100. The number of fluid jet nozzles corresponds to the number of dough strips 100 to be cut into dough pieces. In order to cut across dough strips 100, cross arm 104 is moved along its longitudinal axis a distance sufficient so that its transverse motion component is at least equal to the distance against the width one of the dough strips 100. The components of the motion of cross arm 104 are shown by the two arrows indicated by numeral 112 in FIG. 5. In the situation where dough strip 100 has a width of 1.5 inches, the transverse moment of the movement of cross arm 104 should be at least approximately 1.625 inches. When there is a time of baking for each dough piece 114 of eight minutes, the time in which the fluid jet nozzle cuts the dough and returns to its original position is as follows:

$$\frac{\text{Time of}}{\text{cutting}} = \frac{\text{Product Flow}}{\text{Baking Time}} = \frac{284 \text{ ft.} \times 12 \text{ in./ft.}}{8 \text{ min.}} \times \frac{426 \text{ in./min.}}{60 \text{ sec./min.}}$$

The cutting fluid stream is pulsed in the sense that once the fluid jet cutting of the dough is finished, the fluid jet flow is stopped so as to allow the return of fluid jet nozzles to their original position for the start of the next cutting cycle.

In order to obtain a clean and quick cutting of the dough ribbon, a cohesive high velocity liquid jet should be used, such as, the liquid jet of U.S. Pat. No. 3,524,367. The pertinent portions of U.S. Pat. No. 3,524,367 are incorporated herein by reference. The U.S. Pat. No. 3,524,367 shows useful conventional liquid jet apparatus which can be made more by modification into an advantageous high velocity liquid jet, the latter having better depth penetration effectiveness. The conventional jet apparatus has a nozzle comprising a fine hole usually tubular (between about 0.003 and 0.500 inch long or 3 to 30 diameters) and circular in cross-section (between about 0.001 and 0.1 inch in diameter) in a housing with a rounded entry. Preferably the orifice diameter is between about 0.01 and about 0.005 inch. The working fluid enters the hole to produce the jet. Threads or other connecting means are provided in the housing of the nozzle entry connected to a high pressure line connected to a pressurizing system for the working fluid. There is turbulent working fluid in the hole in the nozzle when no long chain polymer is provided in the working fluid. Non-turbulent working fluid is achieved in the hole in the nozzle and a cohesive jet is produced upon exit from the nozzle by adding a long chain polymer to the work fluid. The high shear forces upon the moving working liquid at the interface between the working liquid which apparently acts upon the linear polymer at the interface to substantially reduce the coefficient of friction at the interface and the polymer reduces the dispersion of the jet produced. A cohesive jet is produced without substantially reduced velocity.

When water is used as the cutting fluid (or as a component of it), calcium and iron must first be removed from the water.

Long chain polymers, including natural or synthetic polymers, are well known in the prior art and are suitable for use in the fluid jet liquid in the invention providing they can be dissolved in the working liquid such as by direct dissolution in the working fluid with or without the application of heat or by the use of solvents for the linear polymer which are miscible with the working liquid long chain polymers which are usually suitable are those where the molecular chain is essentially linear and not substantially cross linked with adjacent molecular chains, although there can be branching within individual chains. In general, the preferred long chain polymers have an average molecular weight between about 10,000 and 7,000,000. Specific examples are polyalkylene oxides, such as, polyethylene oxide which is usually dispersed in a lower alkanol having 1 to 6 carbon atoms such as isopropanol and introduced into the working liquid usually water; alkyl substituted celluloses, such as the methyl celluloses which are introduced into the heated working liquid usually water and the mixture is then cooled to bring the methyl celluloses into solution and gelatin which is dissolved in the working liquid, usually water. As will be appreciated the particular long chain polymer selected must be dissolvable in the working liquid in order to properly function for the purposes of the present invention so that the characteristics of the working liquid will determine in part the selection of the long chain polymer. The preferred long chain polymer is ethylene glycol.

It is preferred to use between about 500 and 30,000 parts (particularly between 1,000 and 10,000 parts) of the long chain polymer per million parts of the working liquid. It is also preferred that the viscosity of the combination at low shear rates be between about 10 and 1000 times greater than the viscosity of the working liquid alone. These variables have particularly been found to be suitable with water.

The numerous working liquids known to the prior art as being used, however the most economical for penetration purposes is water and this is very much preferred for this purpose of the present invention. Other fluids are various edible low viscosity non-chlorinated oils, alcohols, glycerine and various mixtures of alcohols and glycerine with water. All are characterized by having low viscosities near the viscosity of water. The linear polymer in each mixture increases the cohesiveness of the liquid jet.

Another preferred working liquid is an edible oil.

U.S. Pat. No. 4,356,197, the pertinent parts of which are incorporated herein by references teaches hydrogenated jojoba oils which are among the preferred edible oil herein. Vegetable oil is also a preferred edible oil.

In general high velocity jets are those preferably in the range between about 300 and 4,000 feet per second, or more, at the exit from the nozzle and are usually traveling at a velocity at or exceeding the velocity of sound in air (1080 feet per second)—preferably about twice the speed of sound. In order to produce these velocities the working liquid is pressurized to between about 3,000 and 100,000 pounds per square inch, or more, and the nozzle is usually circular in cross section with a diameter of between about 0.001 inch and 0.1 inch depending upon the particular combination of working fluid and linear polymer. Preferably the orifice diameter is between about 0.01 and about 0.005 inch. The nozzles can have other cross-sectional shapes having an area between 0.000001 and 0.01 square inches, although this is not preferred.

The high velocity liquid jets can be swivable in order to achieve faster cutting of the dough ribbon.

Finely-divided edible solid materials can be added to the working fluid for facilitating the fast cutting of the dough ribbon. The materials must be smaller in diameter than the nozzle hole.

Figure 6:
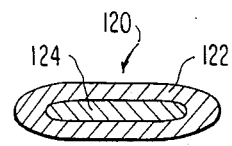
FIG. 6 is a side elevational view of a flattened tube of dough containing a fruit filler which can be cut by the fluid jet cutting device of FIG. 1.

FIG. 6 shows a cross-sectional view of dough ribbon 120 composed of dough sheath 122 (40 weight percent) and fruit filling 124 (60 weight percent). Filled dough ribbon can be prepared by conventional coextrusion techniques used for making cookies such as fig newtons and blueberry newtons. Dough ribbon 120 can be cut into pieces of dough as illustrated for cutting dough ribbon 16 in FIG. 1. Preferably fruit filling 124 is a blueberry filling having the following formula (weight percentages based on the entire weight of the filler):

| Ingredients | Weight Percent |
| --- | --- |
| Frozen fruit plus juice | 20 to 30 |
| Granulated sugar | 20 to 30 |
| Pectin | 0.5 to 1.5 |
| Gums or stabilizers | 0.05 to 0.2 |
| Food colors | 0.05 to 0.2 |
| Sodium benzoate | 0.05 to 0.1 |
| Corn syrup | 20 to 30 |
| Starches | 5 to 10 |
| Fruit solids | 6 to 8 |
| Salt | 0.1 to 0.5 |
| Citric acid | 0.1 to 0.3 |
| Fruit flavors | 0.1 to 0.3 |
| Dextrose | 5 to 10 |
| Water | 0.5 to 2 |

By way of summary, the invention involves the cutting of extruded doughs, such as, fig newtons, using a high pressure fluid jet. The result is a much smoother or "cleaner" cut than that obtained with traditional cutting methods. Another advantage of fluid jet cutting of the invention is that there is little dust produced as when compared to a guillotine-type cutter. The fluid used for the jet cutting can be water, but if only water is used post-cutting drying may be required to remove residual surface water from the product as a result of water cutting. Preferably a mixture of a polymer and an edible oil is used for the cutting liquid since a smoother cut is obtained therewith. The polymer and the oil must be food grade and generally-recognized-as-safe. A polyethylene glycol is preferably used as the polymer.

The invention also involves the combination of a dough extruder and a high pressure fluid jet for cutting the extruded dough.

What is claimed is:

1. Apparatus for preparing unbaked dough pieces, comprising, in combination:
   (a) means for forming dough into a ribbon of unbaked dough;
   (b) means for carrying said ribbon of unbaked dough;
   (c) high velocity liquid jet means adapted to cut said moving ribbon of unbaked dough into pieces having flat, smooth and uniform ends by means of said high velocity liquid jet of means (c) while said ribbon of dough is being transported on said carrying means (b), said high velocity jet means cutting said ribbon of unbaked dough at an angle perpendicular to the direction of travel of said ribbon of unbaked dough, and said high velocity liquid jet being at a pressure between about 20,000 and about 45,000 pounds per square inch; and
   (d) means for supplying liquid to high velocity liquid jet means (c).

2. Apparatus as claimed in claim 1 where the forming means (a) forms unbaked dough into a ribbon of unbaked dough which is a composite of laminated unbaked dough having similar viscosities.

3. Apparatus as claimed in claim 1 wherein the forming means (a) enrobes separate masses selected from the group consisting of fruit filler and confectionary filler within said ribbon of unbaked dough as it is being formed and wherein each unbaked dough piece contains one of said enrobed masses.

4. Apparatus as claimed in claim 1 wherein the forming means (a) formed the ribbon of unbaked dough with continuous passageway therein along the central axis of said ribbon of unbaked dough and fills said continuous passageway with a member selected from the group consisting of fruit filler and confectionary filler.

5. Apparatus as claimed in claim 1 wherein said ribbon of unbaked dough does not contact said carrying means (b) in the immediate region of said ribbon of unbaked dough where said liquid jet means cuts said ribbon of unbaked dough.

6. Apparatus as claimed in claim 1 wherein the ends of the pieces are perpendicular to the longitudinal axes of said ribbon.

7. Apparatus for preparing extruded unbaked dough pieces, comprising, in combination:
   (a) an extruder for forming unbaked dough into a ribbon of extruded unbaked dough;
   (b) means for carrying or advancing said ribbon of extruded unbaked dough;
   (c) high velocity liquid jet means adapted to cut said moving ribbon of extruded unbaked dough into pieces having flat, smooth and uniform ends by means of said high velocity liquid jet of means (c), while said ribbon of dough is being transported on said carrying means (b), said high velocity jet means cutting said ribbon of unbaked dough at an angle perpendicular to the direction of travel of said ribbon of unbaked dough, and said high velocity liquid jet being at a pressure between about 20,000 and about 45,000 pounds per square inch; and
   (d) means for supplying liquid to high velocity liquid jet means (c).

8. Apparatus as claimed in claim 7 wherein said carrying means (b) is a conveyor belt.

9. Apparatus as claimed in claim 7 wherein said ribbon of unbaked dough does not contact said carrying means (b) in the immediate portion of said ribbon of unbaked dough where said liquid jet means cuts said ribbon of unbaked dough.

10. Apparatus as claimed in claim 9 wherein said carrying means (b) is comprised of two aligned conveyor belt means, the adjacent ends of which form a narrow slot which mates with the path of said jet cutting means (c) when said jet cutting means (c) is cutting said ribbon of unbaked dough, the top portions of said conveyor belts being aligned in a straight line.

11. Apparatus as claimed in claim 7 wherein said liquid is selected from the group consisting of (i) water, (ii) water and an edible, long-chain polymer and (iii) an edible, long-chain polymer and an edible oil.

12. Apparatus as claimed in claim 11 wherein said liquid is a combination of an edible, long-chain polymer and an edible oil.

13. Apparatus as claimed in claim 11 wherein the velocity of said high velocity fluid jet is between about 500 and about 4,000 feet per second.

14. Apparatus as claimed in claim 11 wherein the temperature of said high velocity fluid jet is between about 20° and about 40° C.

15. Apparatus as claimed in claim 7 wherein said carrying means (b) is comprised of two aligned conveyor belt means, the adjacent ends of which form a narrow slot which mates with the path of said jet cutting means (c) when said jet cutting means (c) is cutting said ribbon of unbaked dough, the top portions of said conveyor belts being aligned in a straight line.

16. Apparatus as claimed in claim 15 wherein the velocity of said high velocity fluid jet is between about 500 and about 4,000 feet per second.

17. Apparatus as claimed in claim 10 wherein the velocity of said high velocity fluid jet is between about 500 and about 4,000 feet per second.

18. Apparatus as claimed in claim 7 wherein the ends of the pieces are perpendicular to the longitudinal axes of said ribbon.

* * * * *